United States Patent
Mori et al.

(10) Patent No.: US 11,146,755 B2
(45) Date of Patent: Oct. 12, 2021

(54) ON-VEHICLE IMAGE AND SOUND CAPTURING AND RECORDING APPARATUS, ON-VEHICLE IMAGE AND SOUND CAPTURING CONTROL METHOD, AND PROGRAM FOR ON-VEHICLE IMAGE AND SOUND CAPTURING AND RECORDING BASED ON ABNORMALITY DETECTION

(71) Applicant: JVCKENWOOD CORPORATION, Yokohama (JP)

(72) Inventors: Toshio Mori, Yokohama (JP); Katsuyuki Nagai, Yokohama (JP); Akinori Sugata, Yokohama (JP); Takayuki Arase, Yokohama (JP); Hitoshi Sunohara, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 17/016,617

(22) Filed: Sep. 10, 2020

(65) Prior Publication Data

US 2020/0412999 A1  Dec. 31, 2020

Related U.S. Application Data

(63) Continuation of application No. PCT/JP2019/006675, filed on Feb. 22, 2019.

(30) Foreign Application Priority Data

Mar. 20, 2018 (JP) .............................. JP2018-052017

(51) Int. Cl.
*H04N 5/77* (2006.01)
*B60R 11/04* (2006.01)
(Continued)

(52) U.S. Cl.
CPC ............... *H04N 5/77* (2013.01); *B60R 11/04* (2013.01); *G10K 11/002* (2013.01); *G10L 25/51* (2013.01); *H04N 5/9202* (2013.01); *H04N 7/18* (2013.01)

(58) Field of Classification Search
None
See application file for complete search history.

(56) References Cited

U.S. PATENT DOCUMENTS

| 4,258,421 A | * | 3/1981 | Juhasz | ................... G07C 5/085 |
| | | | | 340/870.16 |
| 5,758,311 A | * | 5/1998 | Tsuji | ....................... F16F 15/02 |
| | | | | 701/111 |

(Continued)

FOREIGN PATENT DOCUMENTS

JP 2017-134646 A  8/2017

OTHER PUBLICATIONS

EPO and Google English Translation of JP 2017-134646 A (Year: 2017).*

*Primary Examiner* — Stefan Gadomski
(74) *Attorney, Agent, or Firm* — Procopio, Cory, Hargreaves & Savitch LLP

(57) ABSTRACT

A dashcam serving as an on-vehicle image capturing and recording apparatus includes: a cancellation processing unit configured to perform cancellation processing for reducing an electronic device sound on a sound acquired by a surrounding image/sound acquisition unit based on the characteristics of an electronic device sound acquired by an electronic device sound acquisition unit; and an abnormality detection unit configured to detect an abnormality of a vehicle, in which the acquired sound of the surroundings of the vehicle and a cancel sound are temporality recorded, a recording control unit is configured to discard the cancel sound and integrate only the sound of the surroundings of (Continued)

the vehicle with the image and record the integrated data when the abnormality detection unit does not detect an abnormality and otherwise records the cancel sounds and the sounds of the surroundings of the vehicle along with the image as overwriting prohibited data.

7 Claims, 4 Drawing Sheets

(51) Int. Cl.
<br>*G10K 11/00* (2006.01)
<br>*G10L 25/51* (2013.01)
<br>*H04N 5/92* (2006.01)
<br>*H04N 7/18* (2006.01)

(56) References Cited

U.S. PATENT DOCUMENTS

| | | | | |
|---|---|---|---|---|
| 6,420,975 | B1* | 7/2002 | DeLine | H04M 1/6075 340/815.4 |
| 6,446,002 | B1* | 9/2002 | Barton | G01C 21/3629 340/988 |
| 9,893,697 | B1* | 2/2018 | Churchwell, II | G10L 21/0224 |
| 10,163,434 | B1* | 12/2018 | Valeri | H03G 3/20 |
| 10,276,187 | B2* | 4/2019 | Gross | B60R 25/31 |
| 10,375,234 | B1* | 8/2019 | Keiser | H04N 21/84 |
| 10,818,109 | B2* | 10/2020 | Palmer | B60R 1/00 |
| 2005/0053244 | A1* | 3/2005 | Onishi | G10K 11/17854 381/71.11 |
| 2009/0274320 | A1* | 11/2009 | Kino | G10K 11/17857 381/94.7 |
| 2011/0142248 | A1* | 6/2011 | Sakamoto | G10K 11/17854 381/71.4 |
| 2012/0316734 | A1* | 12/2012 | Takagi | B60Q 5/008 701/45 |
| 2013/0188794 | A1* | 7/2013 | Kawamata | G08G 1/163 381/56 |
| 2014/0072134 | A1* | 3/2014 | Po | G10K 11/17885 381/71.11 |
| 2014/0094228 | A1* | 4/2014 | Hamelink | H04M 1/6091 455/569.2 |
| 2014/0286500 | A1* | 9/2014 | Iwamoto | G05D 19/02 381/71.4 |
| 2014/0322930 | A1* | 10/2014 | Sizelove | H01R 43/20 439/40 |
| 2015/0032451 | A1* | 1/2015 | Gunn | G10L 15/20 704/244 |
| 2015/0269925 | A1* | 9/2015 | Kanaya | B60Q 5/008 381/71.4 |
| 2015/0353088 | A1* | 12/2015 | Ishikawa | G05D 1/0061 701/23 |
| 2015/0365761 | A1* | 12/2015 | Alderson | G10K 11/17854 381/71.6 |
| 2016/0029111 | A1* | 1/2016 | Wacquant | H04R 3/005 381/71.4 |
| 2016/0134968 | A1* | 5/2016 | Chung | G10K 11/17857 381/71.4 |
| 2016/0196819 | A1* | 7/2016 | Wurtz | G10K 11/17861 381/94.3 |
| 2016/0284337 | A1* | 9/2016 | Inoue | G10K 11/17854 |
| 2016/0300559 | A1* | 10/2016 | Lee | G10K 11/1785 |
| 2017/0186463 | A1* | 6/2017 | Prins | G11B 20/10527 |
| 2017/0200443 | A1* | 7/2017 | Kurosawa | H03G 3/3005 |
| 2017/0263126 | A1* | 9/2017 | Kim | G10L 25/51 |
| 2017/0305440 | A1* | 10/2017 | Oba | B60W 50/08 |
| 2017/0310873 | A1* | 10/2017 | Hayashi | H04N 5/232939 |
| 2017/0347180 | A1* | 11/2017 | Petrank | G10L 25/51 |
| 2018/0075834 | A1* | 3/2018 | Fong | H04R 3/04 |
| 2018/0184195 | A1* | 6/2018 | Boesen | H04R 29/001 |
| 2018/0211647 | A1* | 7/2018 | Tani | G10K 11/17833 |
| 2018/0227658 | A1* | 8/2018 | Hviid | A61B 5/117 |
| 2018/0268803 | A1* | 9/2018 | Pfaffinger | G10K 11/17835 |
| 2018/0277132 | A1* | 9/2018 | LeVoit | G10L 15/26 |
| 2018/0286378 | A1* | 10/2018 | Shinno | G06T 7/593 |
| 2019/0103090 | A1* | 4/2019 | Cho | G10K 11/17881 |
| 2020/0366987 | A1* | 11/2020 | Furuta | G10K 11/17817 |
| 2020/0377114 | A1* | 12/2020 | Noda | B60K 28/06 |

* cited by examiner

ON-VEHICLE IMAGE AND SOUND CAPTURING AND RECORDING APPARATUS, ON-VEHICLE IMAGE AND SOUND CAPTURING CONTROL METHOD, AND PROGRAM FOR ON-VEHICLE IMAGE AND SOUND CAPTURING AND RECORDING BASED ON ABNORMALITY DETECTION

CROSS REFERENCE TO RELATED APPLICATION

The present application is a Bypass Continuation of PCT/JP2019/006675 filed on Feb. 22, 2019, which is based upon and claims the benefit of priority from Japanese Patent Application No. 2018-052017, filed on Mar. 20, 2018, the entire contents of which are hereby incorporated by reference.

BACKGROUND

The present disclosure relates to an on-vehicle image capturing and recording apparatus, an on-vehicle image capturing control method, and a program.

In recent years, dashcams have become widespread as an on-vehicle image capturing and recording apparatus. A dashcam records image data as event record data for a period before and after occurrence of an event (detection of acceleration due to an accident etc.). Patent Literature 1 (Japanese Unexamined Patent Application Publication No. 2017-134646) discloses a dashcam that deletes music from sound data included in image data based on music data acquired from an audio device and records the image data from which the music is deleted.

However, with the dashcam disclosed in Patent Literature 1, music cancellation processing for deleting music is performed by operating a changeover switch, which is bothersome for the user.

SUMMARY

A first exemplary aspect is an on-vehicle image capturing and recording apparatus including:

a surrounding image/sound acquisition unit configured to acquire an image and a sound of the surroundings of a vehicle;

a recording control unit configured to control processing for recording the image and the sound acquired by the surrounding image/sound acquisition unit in a recording unit;

an electronic device sound acquisition unit configured to acquire an electronic device sound output from an electronic device;

a cancellation processing unit configured to perform cancellation processing on the sound acquired by the surrounding image/sound acquisition unit for reducing the electronic device sound included in the sound acquired by the surrounding image/sound acquisition unit and an abnormality detection unit configured to detect an abnormality of the vehicle, in which the recording control unit associates the sound acquired by the surrounding image/sound acquisition unit with the image acquired by the surrounding image/sound acquisition unit and records the associated data in a recording medium when the abnormality detection unit does not detect an abnormality, and records the sound acquired by the surrounding image/sound acquisition unit and a cancel sound obtained by performing the cancellation processing by the cancellation processing unit along with the image acquired by the surrounding image/sound acquisition unit in the recording medium when the abnormality detection unit detects an abnormality.

A second exemplary aspect is an on-vehicle image capturing control method including:

a first step of acquiring an image and a sound of the surroundings of a vehicle and acquiring an electronic device sound output from an electronic device;

a second step of performing cancellation processing on the acquired sound of the surroundings of the vehicle for reducing the electronic device sound included in the sound of the surroundings of the vehicle; and a third step of associating the acquired sound of the surroundings of the vehicle with the image of the surroundings of the vehicle and recording the associated data in a recording medium when an abnormality of the vehicle is not detected, and recording a cancel sound obtained by performing the cancellation processing and the acquired sound of the surroundings of the vehicle along with the acquired image of the surroundings of the vehicle in the recording medium when an abnormality of the vehicle is detected.

A third exemplary aspect is a program for causing a computer to execute processing steps for performing on-vehicle image capturing and recording, the processing steps including:

a first processing step of acquiring an image and a sound of the surroundings of a vehicle and acquiring an electronic device sound output from an electronic device;

a second processing step of performing cancellation processing on the acquired sound of the surroundings of the vehicle for reducing the electronic device sound included in the sound of the surroundings of the vehicle based on the characteristics of the acquired electronic device sound; and a third processing step of associating the acquired sound of the surroundings of the vehicle with the acquired image of the surroundings of the vehicle and recording the associated data in a recording medium when an abnormality of the vehicle is not detected, and recording a cancel sound obtained by performing the cancellation processing and the acquired sound of the surroundings of the vehicle along with the acquired image of the surroundings of the vehicle in the recording medium when an abnormality of the vehicle is detected.

DETAILED DESCRIPTION

Figure 1:
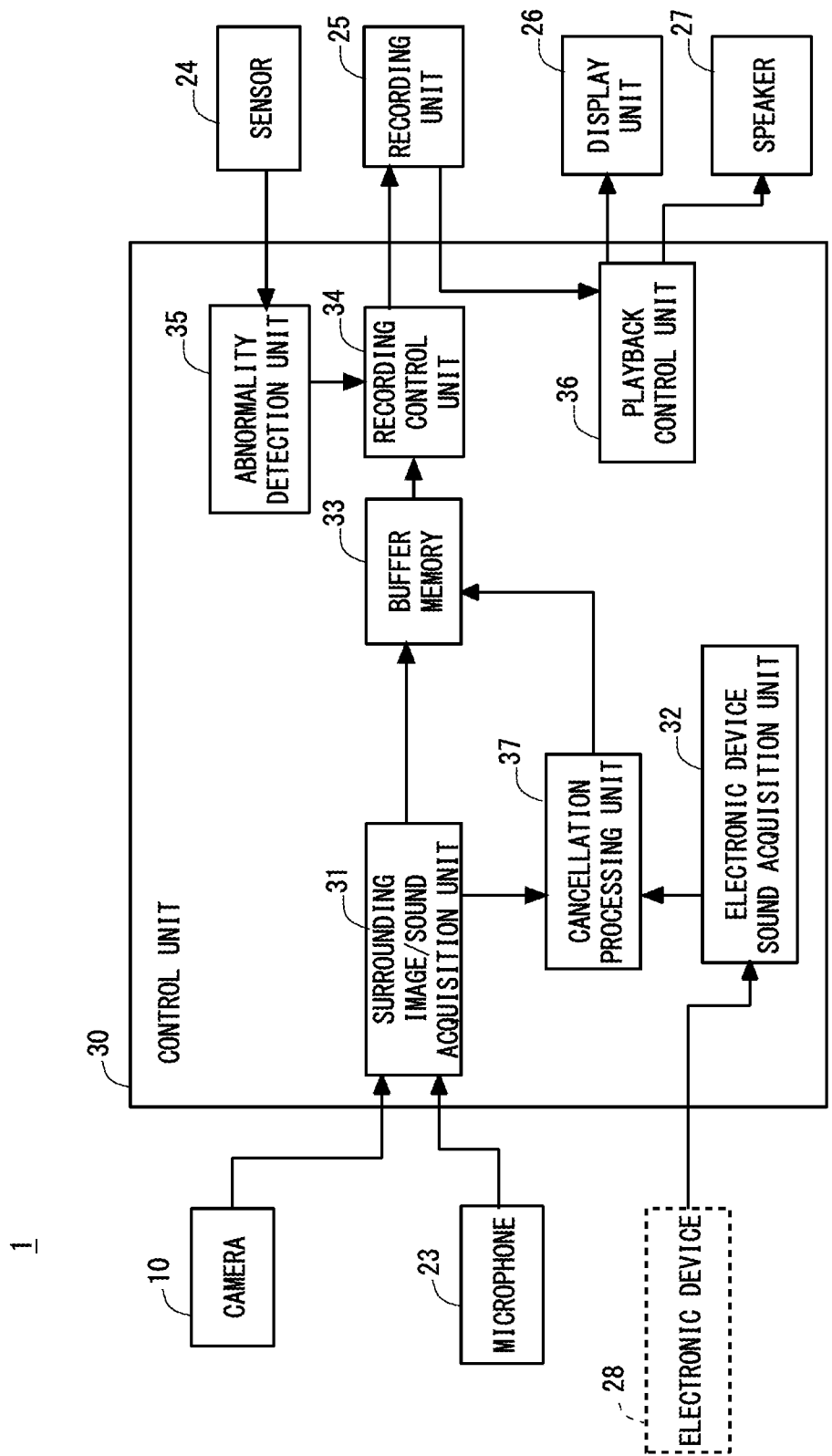
FIG. 1 is a block diagram showing a configuration of a dashcam used as an on-vehicle image capturing and recording apparatus according to a first embodiment.

Hereinafter, the present disclosure will be described through embodiments of the present disclosure. However, the embodiments are not intended to limit the scope of the present disclosure according to the claims. Further, not all of the components/structures described in the embodiments are necessarily indispensable as means for solving the problem. For clarifying the explanation, the following description and the drawings are partially omitted and simplified where appropriate. The same symbols are assigned to the same elements in the drawings and duplicated explanations thereof are omitted where appropriate.

First Embodiment

FIG. 1 is a block diagram showing a structure of a dashcam 1 used as an on-vehicle image capturing and recording apparatus according to a first embodiment. The dashcam 1 is an apparatus that records moving image data obtained by combining at least an image of the surroundings of a vehicle (own vehicle) and sounds inside and outside the vehicle cabin. As shown in FIG. 1, the dashcam 1 includes a camera 10, a microphone 23, a sensor 24, a recording unit 25, a display unit 26, a speaker 27, and a control unit 30.

The camera 10 is for capturing an image of the surroundings of the own vehicle and mainly includes a lens, an image pick-up device, an analogue-front-end (AFE), and a drive motor. Image data captured by the camera 10 is input to the control unit 30. The microphone 23 is a device that is disposed inside the vehicle cabin (for example, to a rearview mirror) and picks up sound inside the vehicle cabin. The sound data picked up by the microphone 23 is input to the control unit 30.

The control unit 30 performs processing related to a recording operation performed by the dashcam 1. The flow of processing related to the recording operation performed by the dashcam 1 will be explained later. The control unit 30 is connected to the camera 10 and the microphone 23 via a wire or wirelessly. The control unit 30 includes a surrounding image/sound acquisition unit 31, an electronic device sound acquisition unit 32, a buffer memory 33, a recording control unit 34, an abnormality detection unit 35, a playback control unit 36, and a cancellation processing unit 37.

The surrounding image/sound acquisition unit 31 acquires an image and sounds of the surroundings of the vehicle. The surrounding image/sound acquisition unit 31 acquires an image of the surroundings of the vehicle captured by the camera 10. Further, the surrounding image/sound acquisition unit 31 acquires, for example, sounds of the surroundings of the vehicle from the microphone 23. The image and the sounds acquired by the surrounding image/sound acquisition unit 31 are temporarily recorded in the buffer memory 33.

The electronic device sound acquisition unit 32 acquires an electronic device sound output from an electronic device 28. Here, the electronic device 28 refers to, for example, a car navigation system or car audio equipment. Note that the electronic device may be a portable device capable of playing back music such as a smartphone. When the electronic device 28 is a portable device, the electronic device sound acquisition unit 32 acquires an audio signal via wireless communication.

The cancellation processing unit 37 performs cancellation processing for reducing (cancelling) the electronic device sound included in the sounds acquired by the surrounding image/sound acquisition unit 31. Specifically, the cancellation processing unit 37 performs cancellation processing by inversing a phase of the acquired electronic device sound and adjusting delay and volume of the acquired electronic sound, and then adding thereto sounds within the vehicle cabin (surroundings) picked up by the microphone. The cancellation processing is not necessarily limited to completely cancelling the electronic device sound and may be processing for reducing the electronic device sound.

The image of the surroundings of the vehicle captured by the camera 10 and acquired by the electronic device sound acquisition unit 32 is temporarily recorded in the buffer memory 33. Further, the two types of sounds, namely, sounds acquired by the surrounding sound/image acquisition unit 31 and cancel sounds obtained by performing cancellation processing on the sounds acquired by the surrounding sound/image acquisition unit 31, are temporarily recorded in the buffer memory 33.

The recording control unit 34 controls recording of the acquired image and sounds into the recording unit 25. In the recording control unit 34, at least one of the two types of sounds recorded in the buffer memory 33 is selected, and the selected type of sound is integrated with the image and recorded in the recording unit 25. Details of the processing will be explained in the flow of processing related to an image capturing and recording operation performed by the dashcam 1 described later.

The recording unit 25 is a memory for recording image data. The recording unit 25 is, for example, a non-volatile memory such as a flash memory. Note that when the recording unit 25 is a removable memory card, the dashcam 1 needs to be provided with a connection interface for connection thereof with the memory card. The recording unit 25 may be another device that records image data via a communication line or the like.

The abnormality detection unit 35 detects occurrence of an abnormality (an event) in the own vehicle by the sensor 24 or the like. For example, when the sensor 24 is an acceleration sensor, the abnormality detection unit 35 acquires an acceleration signal from the sensor 24 and detects occurrence of an abnormality in the own vehicle such as a collision when the acceleration signal is equal to or larger than a preset threshold value. Note that an abnormality is not limited to an accident such as a collision, and may be a sign that an accident may occur such as wobbling of the vehicle body.

Note that detection of an abnormality by the abnormality detection unit 35 is not limited to that using an acceleration sensor. The sensor 24 may be, for example, an optical sensor that detects an abnormality in view of the extent of deviation from a traffic lane, the spacing between other cars or the like. The sensor 24 may be, for example, a sound volume sensor that detects an abnormality when sound whose volume is equal to or larger than a predetermined sound volume is detected, such as when someone screams or speaks in a loud voice within the vehicle cabin, when a large impact noise is generated due to an impact on the own vehicle, or when the own vehicle is honked at by the another vehicle in the vicinity. The sensor 24 may be incorporated in the dashcam 1 or may be provided separately from the dashcam 1.

The playback control unit 36 displays the image part of the image/sound data on the display unit 26 and outputs the sound part of the image/sound data from the speaker 27 when it receives an instruction to play back the designated image/sound data recorded in the recording unit 25.

Next, the flow of processing related to the image capturing and recording operation performed by the dashcam 1 will be explained. Note that in the following explanation, regarding the configuration of the dashcam 1, FIG. 1 is referred to as appropriate.

Figure 2:
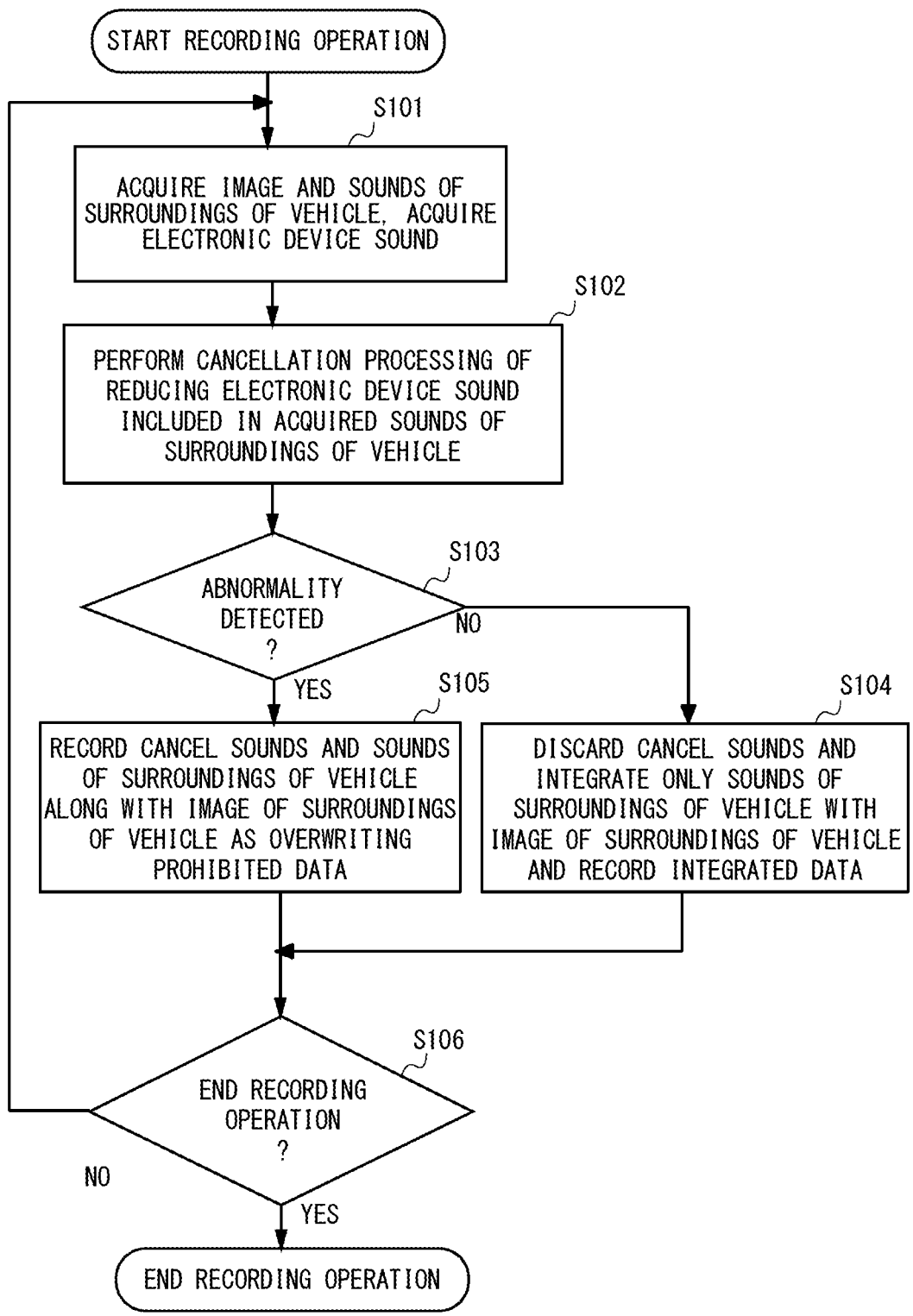
FIG. 2 is a flowchart showing an example of a flow of processing related to a recording operation performed by the dashcam according to the first embodiment.

FIG. 2 is a flowchart showing an example of a flow of processing related to an image capturing and recording operation performed by the dashcam 1 according to the first embodiment. As shown in FIG. 2, first, the surrounding image/sound acquisition unit 31 acquires the image and sounds of the surroundings of the vehicle and the electronic device sound acquisition unit 32 acquires the electronic device sound output from the electronic device 28 (Step S101). Next, cancellation processing for reducing the electronic device sound included in the sounds of the surroundings of the vehicle is performed on the acquired sounds of the surroundings of the vehicle by the cancellation processing unit 37 based on the characteristics of the acquired electronic device sound (Step S102). Note that the image and sounds of the surroundings of the vehicle acquired by the surrounding image/sound acquisition unit 31 and the cancel sounds are temporarily recorded in the buffer memory 33.

The recording control unit 34 determines whether or not the abnormality detection unit 35 has detected abnormality (Step S103). When an abnormality of the vehicle is not detected (when NO) in Step S103, the recording control unit 34 discards the cancel sounds and integrates only the sounds of the surroundings of the vehicle with the image of the surroundings of the vehicle and records the integrated data in the recording unit 25 (Step S104). Here, the method of recording in the recording unit 25 is loop recording. The loop recording is a method of performing recording that is overwritten after lapse of a predetermined time. That is, in the loop recording, when the recording capacity of the prescribed recording region in the recording unit 25 becomes full, the oldest data is overwritten and updated. When an abnormality of the vehicle is detected (when YES) in Step S103, the recording control unit 34 records the cancel sounds and the sounds of the surroundings of the vehicle along with the image of the surroundings of the vehicle in the recording unit 25 as overwriting prohibited data (Step S105).

Following Step S104 or Step S105, it is determined whether or not there is an instruction to end the image capturing and recording operation (Step S106). In Step S106, when there is an instruction to end the image capturing and recording operation (when YES), the image capturing and recording operation is ended. In Step S106, when there is not any instruction to end the image capturing and recording operation (when NO), the processing goes back to Step S101.

Note that in Step S105, when the abnormality detection unit 35 detects an abnormality, the recording control unit 34 may select whether the cancel sounds or the sounds acquired by the surrounding image/sound acquisition unit 31 are to be integrated with the image acquired by the surrounding image/sound acquisition unit 31. Further, when playing back the image and the sounds at the time when an abnormality is detected by the abnormality detection unit 35, the user may select which sounds are to be integrated with the image acquired by the surrounding image/sound acquisition unit 31.

As described above, the dashcam 1 according to the present embodiment acquires an image and sounds of the surroundings of the vehicle as well as the electronic device sound output from the electronic device. Further, cancellation processing for reducing the electronic device sound included in the sounds of the surroundings of the vehicle is performed on the acquired sounds of the surroundings of the vehicle. Further, when an abnormality of the vehicle is detected, both the cancel sounds and the sounds acquired by the surrounding image/sound acquisition unit 31 are recorded along with the image acquired by the surrounding image/sound acquisition unit 31 in the recording unit 25 as overwriting prohibited data. With this configuration, when an abnormality of the vehicle is detected, it is possible to play back sounds related to an accident more reliably by playing back the cancel sounds in the case where the sounds acquired by the surrounding image/sound acquisition unit 31 are disturbed by the electronic device sound and thus difficult to hear. Further, when an abnormality of the vehicle is detected, the sounds acquired by the surrounding image/sound acquisition unit 31, that is, the sounds for which the cancellation processing is not performed are recorded in the recording unit 25 along with the cancel sounds. Therefore, the sounds for which the cancellation processing is not performed can be employed as evidence of the accident that is not falsified. In this way, according to the embodiments of the present disclosure, it is possible to record sounds related to an accident more reliably.

Second Embodiment

Figure 3:
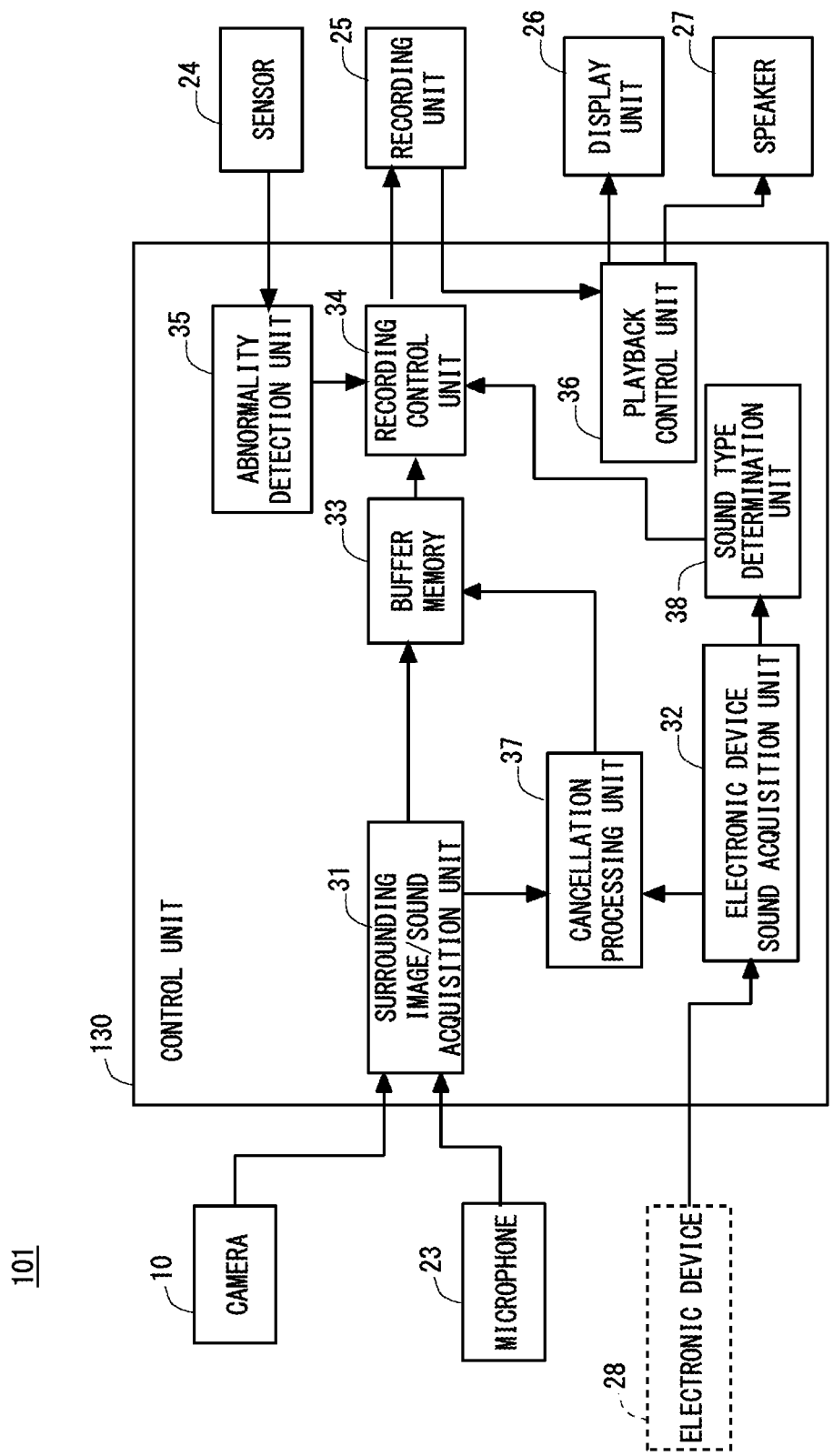
FIG. 3 is a block diagram showing a configuration of a dashcam used as an on-vehicle image capturing and recording apparatus according to a second embodiment.

FIG. 3 is a block diagram showing a configuration of a dashcam 101 used as an on-vehicle image capturing and recording apparatus according to a second embodiment. As shown in FIG. 3, the dashcam 101 according to the second embodiment further includes a sound type determination unit 38 in the control unit 130 in addition to the configuration of the dashcam 1 according to the first embodiment shown in FIG. 1.

The sound type determination unit 38 determines whether or not the electronic device sound acquired by the electronic device sound acquisition unit 32 is the road information or information related to the route set by the user (route guidance information). Determination of whether the sound is the route guidance information is performed by comparing or matching the patterns of the frequency characteristics of the sound and that of the machine voice telling the route guidance information which is specified in advance.

The flow of processing related to the image capturing and recording operation performed by the dashcam 101 is basically the same as the processing for capturing and recording an image performed by the dashcam 1 that has been explained with reference to FIG. 2. In the dashcam 101, when the electronic device sound is determined to be the route guidance information by the sound type determination unit 38 in Step S105 shown in FIG. 2, the recording control unit 34 selects the sounds acquired by the surrounding sound acquisition unit 31 and integrates the sounds with the image acquired by the surrounding image/sound acquisition unit 31. That is, when the acquired electronic device sound is the route guidance information, the sounds for which the cancellation processing is not performed are integrated with the image data.

For example, it is assumed that an accident may be caused when a driver tries to recover from a mistake he/she has made such as taking a route which is different from that instructed or proceeding straight forward by mistake even though the route guidance information of the car navigation system indicated to turn left. Further, it is also assumed that an accident may be caused due to the driver being distracted by the route guidance information. As described above, the route guidance information included in the sounds when an abnormality of the vehicle was detected is often useful in verifying an accident. Therefore, when the acquired electronic device sound is the route guidance information, it is possible to verify the accident more easily by integrating the sounds for which the cancellation processing is not performed with the image data.

Third Embodiment

Figure 4:
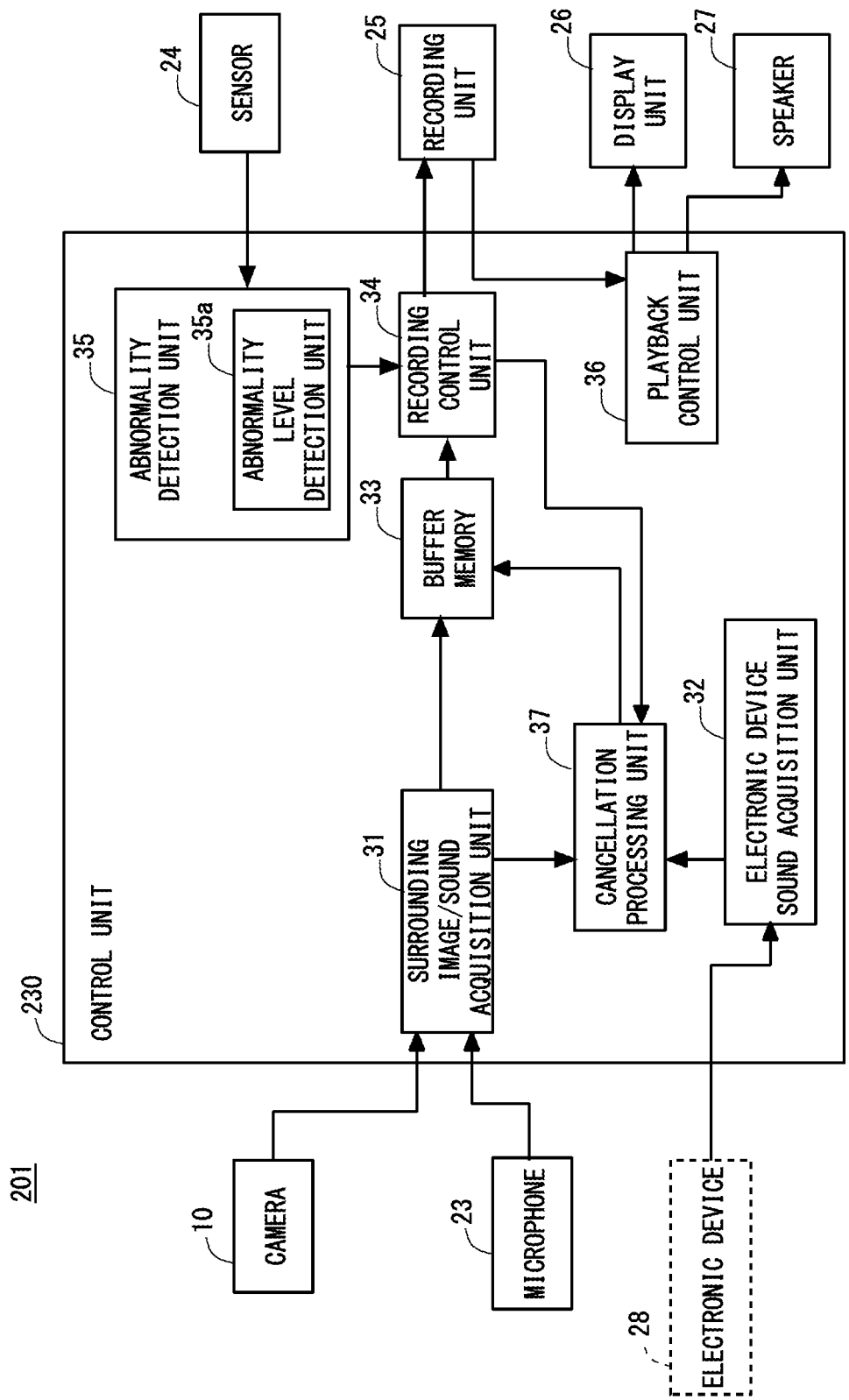
FIG. 4 is a block diagram showing a configuration of a dashcam used as an on-vehicle image capturing and recording apparatus according to a third embodiment.

FIG. 4 is a block diagram showing a configuration of a dashcam 201 used as an on-vehicle image capturing and recording apparatus according to a third embodiment. As shown in FIG. 4, the dashcam 201 according to the third embodiment further includes an abnormality level detection unit 35a in the abnormality detection unit 35 of the control unit 230 in addition to the configuration of the dashcam 1 according to the first embodiment shown in FIG. 1. The abnormality level detection unit 35a detects an abnormality that has occurred to the own vehicle in phases. That is, for example, in the case where the sensor 24 is an acceleration sensor, the abnormality level detection unit 35a determines the level of an abnormality based on the magnitude of the acceleration signal when the abnormality detection unit 35 acquires the acceleration signal from the sensor 24. When the magnitude of the acquired acceleration signal is large, it can be determined that a serious accident such as a collision with another vehicle or a pedestrian has occurred. When the magnitude of the acquired acceleration signal is small, it can be determined that the event that has occurred is a so-called near-miss that is relatively low in the abnormality level such as sudden braking or climbing over a step in the road. When the sensor 24 is a sound volume sensor, a sound determination unit (not shown) may determine whether the sound is an impact noise generated due to an impact, a scream within the vehicle cabin, or a honking sound of another vehicle, or may determine the abnormality level according to the sound volume. Further, a level of risk of collision with another vehicle running in front is determined from the image data captured by the camera 10 or the distance sensor (not shown), and a determination that the abnormality level is high may be made based on the level of risk. In a similar manner, the level of risk of the running vehicle deviating from the lane may be determined from the image data captured by the camera 10.

The recording control unit 34 determines the level of reduction of the electronic device sound included in the sounds acquired by the surrounding image/sound acquisition unit 31 in the cancellation processing unit 37 or whether to refrain from performing the cancellation processing for reducing the electronic device sound included in the sounds acquired by the surrounding image/sound acquisition unit 31 in accordance with the abnormality level detected by the abnormality level detection unit 35a. When it is determined that the accident has a high abnormality level, it is highly likely that the acquired image data can serve as evidence of the accident, and thus it is desirable not to perform the cancellation processing or to lower the level of sound reduction so as to make sure that the data is not regarded as evidence that is falsified. When the recorded data is data of an accident having a relatively low abnormality level such as a so-called near-miss, it is unlikely that the admissibility of the evidence would be demanded. In order to record the cause that led to the determination of the abnormality in more detail, it is desirable to raise the level of reduction of the sounds by performing the cancellation processing for the sounds that are regarded to be irrelevant to the abnormality. When it is determined that the abnormality level is high, in order to achieve compatibility of the admissibility of the evidence with the detailed record of the situation which is not hindered by sounds, both the sounds for which the cancellation processing has been performed and the sounds for which the cancellation processing has not been performed may be recorded along with the image.

The present disclosure made by the inventors of the present application has been explained above in a concrete manner based on embodiments. However, the present disclosure is not limited to the above-described embodiments, and needless to say, various modifications can be made without departing from the spirit and scope of the present disclosure. Further, the structures in each of the embodiments can be switched as appropriate among the embodiments. For example, the dashcam 101 according to the second embodiment may include the abnormality level detection unit 35a of the dashcam 201 according to the third embodiment.

Processing performed by each unit of the on-vehicle image capturing and recording apparatus according to the present disclosure can be implemented by causing a computer to execute a program. More specifically, the program is implemented by loading the program stored in the program memory to a main storage device in the on-vehicle image capturing and recording apparatus and causing the CPU to execute the program. Here, program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line. Further, each component of the on-vehicle image capturing and recording apparatus is not limited to being implemented by software executed by a program, and may instead be implemented by any combination of hardware, firmware, and software.

The present disclosure can be used as an on-vehicle image capturing and recording apparatus for recording captured image data in a vehicle.

What is claimed is:

1. An on-vehicle image capturing and recording apparatus comprising:
   a memory configured to store a program; and
   a central processing unit (CPU) coupled to the memory and configured to execute the program stored in the memory to:
     acquire an image and a sound of the surroundings of a vehicle;
     control processing for recording the acquired image and the acquired sound;
     acquire an electronic device sound output from an electronic device;
     perform cancellation processing on the acquired sound for reducing the electronic device sound included in the acquired sound;
     detect an abnormality of the vehicle,
     wherein the recording the acquired sound comprises controlling a number of types of sound to be recorded based on whether or not the abnormality is detected, and
     wherein the CPU is further configured to execute the program to:
       (i) associate only one type of sound, that is the acquired sound with the acquired image and record the associated data in a recording medium when the abnormality is not detected, and (ii) record two types of sound, that are the acquired sound and a cancel sound obtained by performing the cancellation processing along with the acquired image in the recording medium when the abnormality is detected.

2. The on-vehicle image capturing and recording apparatus according to claim 1, wherein the CPU is further configured to execute the program to
select one of the two types of sound that are the cancel sound and the acquired sound when the abnormality is detected and a predetermined condition is satisfied, and
associate the selected sound with the acquired image.

3. The on-vehicle image capturing and recording apparatus according to claim 2, wherein the CPU is further configured to execute the program to:
determine whether or not the electronic device sound is road information or information related to a route set by a user,
select the acquired sound and associate the acquired sound with the acquired image when a determination that the electronic device sound is the road information or the information related to the route set by the user is made.

4. The on-vehicle image capturing and recording apparatus according to claim 2, wherein the CPU is further configured to execute the program to:
detect an abnormality level in phases,
integrate the acquired sound with the acquired image when the detected abnormality level is equal to or larger than a prescribed value, and
associate the cancel sound with the acquired image when the detected abnormality level is smaller than the prescribed value.

5. The on-vehicle image capturing and recording apparatus according to claim 1, wherein the CPU is further configured to execute the program to:
detect an abnormality level in phases, and
determine a degree of reduction of the electronic device sound included in the acquired sound in the cancellation processing in accordance with the detected abnormality level.

6. An on-vehicle image capturing control method comprising:
acquiring an image and a sound of the surroundings of a vehicle and acquiring an electronic device sound output from an electronic device;
performing cancellation processing on the acquired sound of the surroundings of the vehicle for reducing the electronic device sound included in the sound of the surroundings of the vehicle;
associating only one type of sound, that is the acquired sound of the surroundings of the vehicle with the image of the surroundings of the vehicle and recording the associated data in a recording medium when an abnormality of the vehicle is not detected; and
recording two types of sounds, that are a cancel sound obtained by performing the cancellation processing and the acquired sound of the surroundings of the vehicle along with the acquired image of the surroundings of the vehicle in the recording medium when the abnormality of the vehicle is detected,
wherein the number of types of sounds to be recorded is based on whether or not the abnormality is detected.

7. A non-transitory computer-readable medium that stores a program for causing a computer to execute processing steps for performing on-vehicle image capturing and recording, the processing steps comprising:
acquiring an image and a sound of the surroundings of a vehicle and acquiring an electronic device sound output from an electronic device;
performing cancellation processing on the acquired sound of the surroundings of the vehicle for reducing the electronic device sound included in the sound of the surroundings of the vehicle based on the characteristics of the acquired electronic device sound;
associating only one type of sound, that is the acquired sound of the surroundings of the vehicle with the acquired image of the surroundings of the vehicle and recording the associated data in a recording medium when an abnormality of the vehicle is not detected; and
recording two types of sounds, that are a cancel sound obtained by performing the cancellation processing and the acquired sound of the surroundings of the vehicle along with the acquired image of the surroundings of the vehicle in the recording medium when the abnormality of the vehicle is detected,
wherein the number of types of sounds to be recorded is based on whether or not the abnormality is detected.

* * * * *